United States Patent
Lin et al.

(10) Patent No.: US 9,307,239 B2
(45) Date of Patent: Apr. 5, 2016

(54) METHOD AND APPARATUS FOR DERIVATION OF MOTION VECTOR CANDIDATE AND MOTION VECTOR PREDICTION CANDIDATE

(75) Inventors: Jian-Liang Lin, Yilan County (TW); Yi-Wen Chen, Taichung (TW); Yu-Pao Tsai, Kaohsiung (TW); Yu-Wen Huang, Taipei (TW); Shaw-Min Lei, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 448 days.

(21) Appl. No.: 13/990,345

(22) PCT Filed: Mar. 13, 2012

(86) PCT No.: PCT/CN2012/072238
§ 371 (c)(1),
(2), (4) Date: May 29, 2013

(87) PCT Pub. No.: WO2012/122927
PCT Pub. Date: Sep. 20, 2012

(65) Prior Publication Data
US 2013/0243098 A1  Sep. 19, 2013

Related U.S. Application Data

(63) Continuation of application No. 13/177,808, filed on Jul. 7, 2011, now Pat. No. 8,755,437, and a continuation of application No. 13/236,422, filed on Sep. 19, 2011.

(Continued)

(51) Int. Cl.
*H04N 11/04* (2006.01)
*H04N 19/56* (2014.01)
*H04N 19/52* (2014.01)

(52) U.S. Cl.
CPC ........... *H04N 19/0066* (2013.01); *H04N 19/52* (2014.11)

(58) Field of Classification Search
None
See application file for complete search history.

(56) References Cited

U.S. PATENT DOCUMENTS

| 6,122,317 | A  | * | 9/2000 | Hanami | ............... | H04N 19/56 348/699 |
| 2003/0161403 | A1 | * | 8/2003 | Yang | .................... | H04N 5/145 375/240.16 |

(Continued)

FOREIGN PATENT DOCUMENTS

| CN | 1663280 A | 8/2005 |
| CN | 1926868   | 3/2007 |

(Continued)

OTHER PUBLICATIONS

Jian-Liang Lin, et al, Improved Advanced Motion Vector Prediction, Joint Collaborative Team on Video Coding (JCT-VC) of ITU-T SG16 WP3 and ISO/IEC JTC1/SC29/VVG11, JCTVC-D125, Jan. 20-28, 2011, pp. 1-8, Daegu, KR.

*Primary Examiner* — Frederick Bailey
(74) *Attorney, Agent, or Firm* — McClure, Qualey & Rodack, LLP

(57) ABSTRACT

An apparatus and method for deriving a motion vector predictor are disclosed. A search set comprising of multiple (spatial, or temporal) search MVs with priority is determined, wherein the search MVs for multiple neighboring reference block or one or more co-located reference blocks are configured into multiple search MV groups. In order to improve coding efficiency, embodiments according to the present invention, perform redundancy check every time after a search MV group is searched to determine whether an available search MV found. If an available search MV is found and the available search MV is not the same as a previously derived motion vector predictor (MVP), the available search MV is used as the MVP and the MVP derivation process terminates. Otherwise, the MVP derivation process moves to the next reference block. The search MV group can be configured to include different search MV(s) associated with reference blocks.

18 Claims, 10 Drawing Sheets

Related U.S. Application Data

(60) Provisional application No. 61/452,531, filed on Mar. 14, 2011, provisional application No. 61/453,666, filed on Mar. 17, 2011, provisional application No. 61/476,425, filed on Apr. 18, 2011.

(56) References Cited

U.S. PATENT DOCUMENTS

| | | |
|---|---|---|
| 2003/0202596 A1 | 10/2003 | Lainema et al. |
| 2004/0258153 A1 | 12/2004 | Linzer et al. |
| 2004/0258154 A1 | 12/2004 | Liu et al. |
| 2006/0245497 A1 | 11/2006 | Tourapis et al. |
| 2008/0013628 A1* | 1/2008 | Lu .................. H04N 19/172 375/240.12 |
| 2008/0212676 A1 | 9/2008 | Liu et al. |
| 2009/0220005 A1* | 9/2009 | Kim .................. H04N 19/56 375/240.16 |
| 2011/0293012 A1 | 12/2011 | Au et al. |
| 2012/0099652 A1 | 4/2012 | Woods et al. |
| 2012/0177122 A1 | 7/2012 | Zhou |
| 2012/0219064 A1 | 8/2012 | Zheng et al. |

FOREIGN PATENT DOCUMENTS

| | | |
|---|---|---|
| CN | 101001377 A | 7/2007 |
| WO | 2003026315 A1 | 3/2003 |
| WO | 2007074543 A1 | 7/2007 |
| WO | 2008091117 A1 | 7/2008 |
| WO | 2009115901 A2 | 9/2009 |

* cited by examiner

METHOD AND APPARATUS FOR DERIVATION OF MOTION VECTOR CANDIDATE AND MOTION VECTOR PREDICTION CANDIDATE

CROSS REFERENCE TO RELATED APPLICATIONS

The present inversion claims priority to U.S. Provisional Patent Application, No. 61/452,531, filed Mar. 14, 2011, entitled "New Derivation Method for Temporal Motion Vector Predictor", U.S. Provisional Patent Application, No. 61/453,666, filed Mar. 17, 2011, entitled "The Derivation of Spatial MV/MVP Candidate for Inter, Skip and Merging Prediction Units in Video Compression", and U.S. Provisional Patent Application, No. 61/476,425, filed Apr. 18, 2011, entitled "Redundant MVP checking procedure for Inter, Skip and Merge PUs". The present invention is also related to U.S. Non-Provisional patent application Ser. No. 13/177,808, filed Jul. 7, 2011, entitled "Method and Apparatus for Derivation of Spatial Motion Vector Candidate and Motion Vector Prediction Candidate", and U.S. Non-Provisional patent application Ser. No. 13/236,422, filed Sep. 19, 2011, entitled "Method and Apparatus for Deriving Temporal Motion Vector Prediction". The U.S. Provisional Patent Applications and U.S. Non-Provisional Patent Applications are hereby incorporated by reference is their entireties.

BACKGROUND OF THE INVENTION

1. Field of the Invention

The present invention relates to video coding, in particular, the present invention relates to coding techniques associated with derivation of motion vector candidate and motion vector prediction candidate.

2. Description of the Related Art

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. The transmission, of motion vectors for temporal prediction may require a noticeable portion of the compressed video data, particularly in low-bitrate applications. In order to reduce the bitrate associated with motion vectors, a technique called Motion Vector Prediction (MVP) has been used in the field of video coding. The MVP technique exploits the statistic redundancy among neighboring motion vectors spatially and temporally.

In High Efficiency Video Coding (HEVC), techniques to improve the efficiency of MVP are explored. Both spatial and temporal Motion Vector Predictors are used to increase the possibility of obtaining a predictor to achieve better performance. However, when a derived MVP is the same as a previously derived MVP, the currently derived MVP does not offer any potential to further improve the coding efficiency. Accordingly, in HM-3.0 (HEVC Test Model version 3.0), the MVP process Incorporates redundancy checking during spatial and temporal MVP derivation. While the redundancy checking adopted by HM-3.0 shows certain efficiency improvement, it is desirable to extend redundancy cheek to further improve system performance.

BRIEF SUMMARY OF THE INVENTION

A method and apparatus of deriving a motion vector predictor (MVP) for an MV of a current block in Merge, Inter, or Skip mode are disclosed. In one embodiment according to the present invention, the apparatus and method of deriving a motion vector predictor (MVP) for an MV of a current block in Inter or Merge or Skip mode comprise: receiving motion vectors (MVs) associated with reference blocks of the current block, wherein the reference blocks comprise at least one neighboring reference block of the current block; determining a spatial search set, wherein the spatial search, set comprises at least two spatial search MVs with spatial priorities for the at least one neighboring reference block, wherein said at least two spatial search MVs for the at least one neighboring reference block are configured into spatial search MV groups, and wherein each of the spatial search MV groups consists of at least one of said at least two spatial search MVs for the at least one neighboring reference block; determining whether a first available spatial MV exists for each of the spatial search MV groups according to a spatial search order for the spatial search MV groups, wherein said determining whether a first available spatial MV exists moves to a next spatial search MV group if the first available spatial MV does not exist; and providing the first available spatial MV as a spatial MVP for the current block. The first available spatial MV is redundant if the first available spatial MV is the same as a previous spatial MVP derived from the neighboring reference blocks or let side of the current block. The aspect of neighboring reference block configuration is addressed in this invention. In one embodiment, the neighboring reference blocks comprise a right-most block on top side, an upper-left corner block and an upper-right corner block of the current block in the Inter, Skip or Merge mode, and wherein the spatial search order for the neighboring reference blocks is from right to left. In another embodiment, the neighboring reference blocks comprise a leftmost block on top side and an upper-right corner block of the current block in the Inter, Merge or Skip mode, and wherein the spatial search order for the neighboring reference blocks is from the upper-right corner block to the leftmost block on the top side.

In yet another embodiment according to the present invention, the apparatus and method of deriving a motion vector predictor (MVP) for an MV of a current block in inter, or Merge or Skip mode comprises receiving the motion vectors (MVs) associated with reference blocks of the current block, wherein the reference blocks comprise one or more co-located reference blocks of the current block; determining a temporal search set, wherein the temporal search set comprises at least two temporal search MVs with temporal priorities for each of said one or more co-located reference blocks, wherein said at least two temporal search MVs for said one or more co-located reference blocks are configured into temporal search MV groups, and wherein each of the temporal search MV groups consists of one of said at least two temporal search MVs of one of said one or more co-located reference blocks, all of said at least two temporal search MVs for each of said one or more co-located reference blocks, or said at least two temporal search MVs having a same temporal priority for all of said one or more co-located reference blocks; determining whether a first available temporal MV exists for each of the temporal, search MV groups according to a temporal search order for the temporal search MV groups, wherein said determining whether a first available temporal MV exists moves to a next temporal search MV group if the first available temporal MV does not exist or the first available temporal MV is redundant; and providing the first available temporal MV as a temporal MVP for the current block. The first available temporal MV is redundant if the first available temporal MV is the same as a previous spatial MVP derived from the neighboring reference blocks, in one embodiment, said one or more co-located reference blocks comprise a center co-located block located at center of the co-located block and a right-bottom co-located block located across from a lower-right corner of the co-located block.

DETAILED DESCRIPTION OF THE INVENTION

Figure 1:
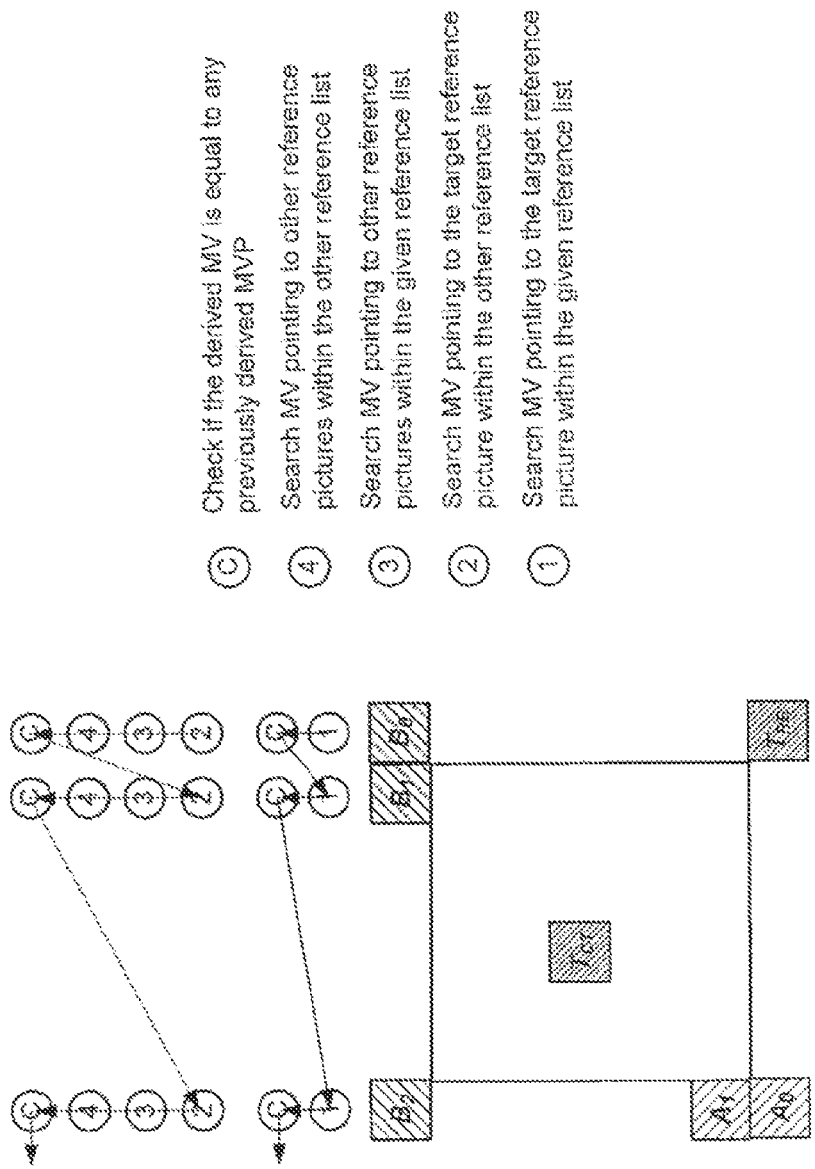
FIG. 1 illustrates the spatial MVP derivation process from top neighboring blocks for Inter mode according to HM-3.0, where AMVP-based candidates are used.

In video coding systems, the spatial and temporal redundancy is exploited using spatial and temporal prediction to reduce the bitrate to be transmitted or stored. The spatial prediction utilizes decoded pixels from the same picture to form prediction for current pixels to be coded. The spatial prediction is often operated on a block by block basis, such as the 16×16 or 4×4 block for luminance signal in H.264/AVC Intra coding. In video sequences, neighboring pictures often hear great similarities, and Motion Compensated Prediction (MCP) is often used to exploit temporal correlation is video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilises a decoded picture or pictures after the current picture in the display order. Since the first version of H.264/AVC was finalized in 2003, forward prediction and backward prediction have been extended to list 0 prediction and list 1 prediction, respectively, where both, list 0 and list 1 can contain multiple reference pictures prior to or/and later than the current picture in the display order. The following describes the default reference picture list configuration. For list 0, reference pictures prior to the current picture have lower reference picture indices than those later than the current picture. For list 1, reference pictures later than the current picture have lower reference picture indices than those prior to the current picture. For both list 0 and list 1, after applying the previous rules, the temporal distance is considered as follows; a reference picture closer to the current picture has a lower reference picture Index. When a block in a list 0 or list 1 co-located picture has the same block location as the current block in the current picture, it is called a list 0 or list 1 co-located block, or called a co-located block in list 0 or list 1, For the High-Efficiency Video Coding (HEVC) standard under development, the unit for motion estimation/compensation mode is called Prediction Unit CPU), where the FU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction in addition to the list 0 prediction.

In video coding systems, motion vectors (MVs) and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years, in this disclosure, MVP may also refer to Motion Vector Predictor and the abbreviation is used when there is no ambiguity. The MVP technique exploits the statistical redundancy among neighboring motion vectors spatially and temporally. When MVP is used, a predictor for the current motion vector is chosen and the motion vector residue, i.e., the difference between the motion vector and the predictor, is transmitted. The motion vector residue is also termed as motion vector difference (MVD). The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

For the inter mode in the HEVC Test Model version 3.0 (HM-3.0), two spatial motion vector predictors (MVPs) and one temporal MVP are included in the candidate set of MVPs. For Skip mode (with zero motion vector differences and zero prediction residues) and Merge mode (with zero motion vector differences) In the current HM, four spatial MVPs and one temporal MVP are included in the candidate set of MVPs. In HM-3.0, the encoder selects one final MVP within the candidate set of MVPs for Inter, Skip, and Merge modes and transmits the index of the selected MVP to the decoder.

For Inter mode, the reference picture index is explicitly transmitted to the decoder. For Skip and Merge modes, the reference picture Index is equal to the reference picture index of the selected neighboring block when a spatial MVP is selected as the final MVP, and the reference index is always set to the majority of reference picture indices of neighboring blocks when a temporal MVP is selected as the final MVP.

FIG. 1 illustrates the process of deriving an MVP from a candidate set of MVPs used in HM-3.0 for Inter mode (using AMVP-based candidates) including two spatial MVPs and one temporal MVP. The search order of MVPs is as follows:

1. Left MVP (the first available from $A_0$ and $A_1$),
2. Top MVP (the first available from $B_0$, $B_1$, and $B_2$), and
3. Temporal MVP (the first available from $T_{RB}$ and $T_{CT}$).

As shown in FIG. 1, the left MVP is derived based on two neighboring blocks ($A_0$ and $A_1$) on the left, of the current block and the search order is from bottom to top (from $A_0$ to $A_1$). The top MVP is derived based on three neighboring blocks ($B_0$, $B_1$, and $B_2$) on the top of the current block and the search order is from right to left (front $B_0$ to $B_2$). The neighboring blocks such as the left blocks ($A_0$ to $A_1$) and top blocks ($B_0$ to $B_2$) are referred to as referent blocks in this disclosure. Since these spatial blocks are used to derive spatial MVP, these blocks are also referred to as neighboring reference blocks in this disclosure. The neighboring reference blocks can be properly selected from surrounding blocks of the current block to derive spatial MVP or MVPs.

With a target reference picture indicated by a given reference picture index of a given reference picture list, a spatial MVP is defined as the first available MV pointing to the target reference picture within the given reference picture list. Since the first available MV is used as a spatial MVP in this case, the first available MV is also referred to as the first available spatial MV. If all the neighboring blocks do not have any MV pointing to the target reference picture within the given reference picture list, the MVP will be derived as a scaled MV based on the first available MV within the given reference picture list or within the other reference picture list.

In HM-3.0, the top MVP derivation also includes redundancy check to determine if the second MVP is equal to the first MVP (left MVP) for increasing the possibility of obtaining non-redundant MVPs. The searching order for the spatial MVP is illustrated by the solid and dashed arrows as shown in FIG. 1. For the top MVP, the MVs with the $1^{st}$ priority (marked as 1 surrounded by a circle) from $B_0$ to $B_2$ are first searched, which is illustrated by the solid arrows. When an available MV with the $1^{st}$ priority is found, the available MV is checked to determine whether the available MV is the same as the left MVP. If it is the same as the left MVP, the next position will be searched; otherwise, the available MV will be used as the top MVP, if no search MV with the $1^{st}$ priority is available or the available MV associated the $1^{st}$ priority is the same as the left MVP, the search MVs with the $2^{nd}$, $3^{rd}$, and $4^{th}$ priorities will be searched with a search order from block $B_0$ to block $B_2$, as shown by the dashed arrows in FIG. 1. Once the first available MV with my of the $2^{nd}$, $3^{rd}$, and $4^{th}$ priorities is found in $B_0$, the first available MV is checked to determine whether the first available MV is the same as the previously derived MVP, i.e., the left MVP. If the first available MV is the same as the left MVP, the next position will be searched; otherwise, the first available MV will be selected as the top MVP.

In the example of FIG. 1, various motion vectors associated with a neighboring reference block, are checked to determine whether any MV exists. The various motion vectors associated with the neighboring reference block include an MV pointing to a target reference picture in a given reference list, an MV pointing to the target reference picture in other reference list, an MV pointing to other reference pictures in the given reference list, and an MV pointing to the other reference pictures in the other reference list. These various motion vectors associated with a neighboring reference block are referred to as search MVs for the neighboring reference block in this disclosure. Furthermore, since these various motion vectors are used for deriving spatial MVP, these search MVs are also referred to as spatial search MVs associated with the neighboring reference block in this disclosure. As mentioned above, the spatial search MVs have respective search priorities, referred to as spatial priorities in this disclosure. The spatial search MVs from all neighboring reference blocks are referred to as a spatial search set in this disclosure. As shown in FIG. 1, the search for a spatial MVP will scan through every MV in the spatial search set according to a search order indicated by solid and dashed lines. Since the search order is used to find a spatial MVP In this case, the search, order is also referred to as spatial search order in this disclosure. FIG. 1 also illustrates that a redundancy check is performed after every $1^{st}$-priority spatial search MV is searched and the search MV exists. After the $1^{st}$-priority spatial search MVs are searched for all spatial reference blocks, the search scans $2^{nd}$-priority through $4^{th}$-priority search MVs for each of the neighboring reference blocks from $B_0$ through $B_2$. A redundancy check is performed after $2^{nd}$-priority through $4^{th}$-priority search MVs are searched and a first available spatial MV exists. As shown in FIG. 1, the redundancy check can be performed after every search MV is scanned or a group of multiple spatial search MVs are scanned. For convenience, the set of spatial search MVs that the scan is applied and the redundancy check is applied afterward is referred to as a search MV group in this disclosure. Accordingly, a search MV group may consist of only one spatial search MV (e.g., $1^{st}$-priority spatial search MV in the example of FIG. 1) or multiple spatial search MVs (e.g., $2^{nd}$-priority through $4^{th}$-priority search MVs in the example of FIG. 1). The spatial search order among the neighboring reference blocks for the blocks on the top side always goes from right to left. In other words, block $B_0$ has the highest priority and $B_2$ has the lowest priority among the neighboring reference blocks.

Figure 2:
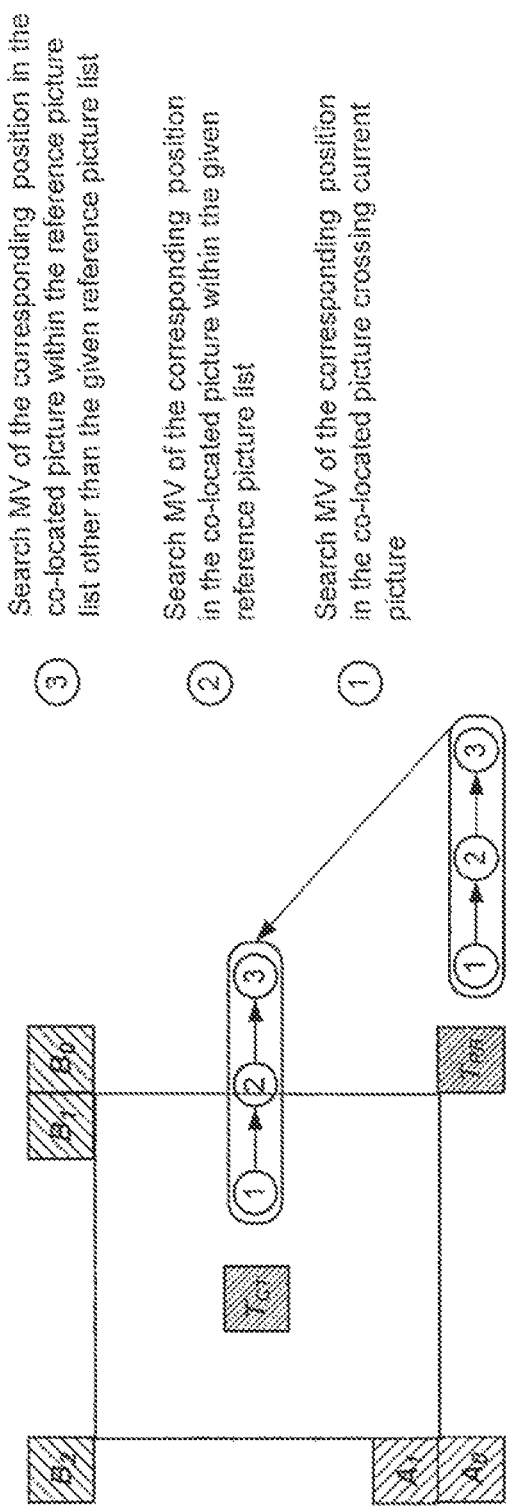
FIG. 2 illustrates the temporal MVP derivation process from co-located blocks for inter mode according to HM-3.0, where AMVP-based candidates are used.

In HM-3.0, the temporal MVP is searched after the spatial MVP determined. FIG. 2 illustrates the process of temporal MVP derivation. The temporal MVP is derived based on MVs associated wish co-located reference blocks $T_{CT}$ and $T_{RB}$. Block $T_{RB}$ is adjacent to the bottom-right corner of die co-located block. Block $T_{CT}$ is found by mapping the center position of the current PU to the corresponding position in the co-located picture. If a MV associated with block $T_{RB}$ exists, it will be used for deriving the temporal MVP; otherwise, MVs associated with $T_{CT}$ will be searched. The temporal MVP is derived using the list 0 MV or list 1 MV of the corresponding position in the co-located picture. The temporal MVP is defined as the first available MV crossing the current picture, where the current picture is temporarily between two pictures associated with the first available MV. If both motion vectors cross the current picture, or both do not cross, the one whose reference picture list is the same as the given reference picture list will be selected; if that corresponding position does not have a motion vector within the reference picture list as the given reference picture list, the motion vector within the other reference picture list will be selected. Use motion vector will be scaled according to temporal distances. The scaling factor is based on the ratio of the temporal distance between the current picture and the given reference picture for current block to the temporal distance between the co-located picture and the reference picture associated with the MV of the corresponding position in the co-located picture.

In the example of FIG. 2, various motion vectors associated with a co-located reference block are checked to determine whether any MV exists. The various motion vectors associated with the co-located reference block include an MV of corresponding position in the co-located picture crossing current picture, an MV of corresponding position in the co-located picture within the given reference picture list, and an MV of the corresponding position in the co-located picture within the reference picture list other than the given reference picture list. These various motion vectors associated with a co-located reference block are referred to as search MVs for the co-located reference block in this disclosure. Furthermore, since these various motion vectors are used for deriving temporal MVP, these MVs are also referred to as temporal search MVs for the co-located reference block in this disclosure. As mentioned above, the temporal search MVs have respective search priorities, referred to as temporal priorities in this disclosure. The temporal search MVs front all co-located reference blocks are referred to as a temporal search set in this disclosure. As shown in FIG. 2, the search for a temporal MVP will scan through every MV in the temporal search set according to a search order indicated by a solid line. Since the search order is used to find a temporal MVP in this case, the search order is referred to as temporal, search order in this disclosure. When a search MV exists, the search MV is referred to as the first available temporal MV. After all MVPs are found, the redundant MVPs are removed from the candidate set of MVPs before coding the index of the best MVP.

Figure 3:
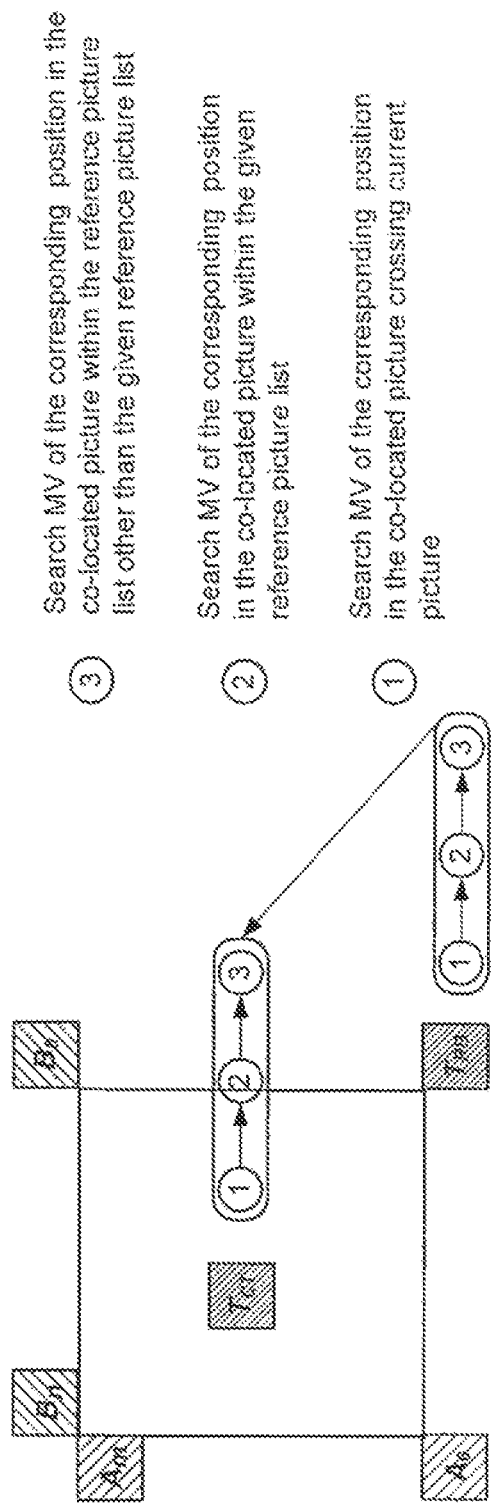
FIG. 3 illustrates the temporal MVP derivation process from co-located blocks for Skip and Merge modes according to HM-3.0, where Merge-based candidates are used.

In the current HM (version 3.0), if a block is encoded as Merge mode, an MVP Index is signaled to indicate which MVP from the candidate set of MVPs is used for this block to be merged with. FIG. 3 illustrates the process of deriving the MVP from a candidate set of MVPs including four spatial MVPs and one temporal MVP. The search order of MVPs is as follows:

1. Left MVP ($A_m$),
2. Top MVP ($B_n$),
3. Temporal MVP (the first available from $T_{RB}$ and $T_{CT}$),
4. Right-top MVP ($B_0$), and
5. Left-bottom MVP ($A_0$)

For the spatial MVPs in Merge mode, the reference picture index will be the same as that of the selected block. For example, if block $A_m$ is selected, the MV and the reference picture index of block $A_m$ are used for the current PU. If the selected block utilizes bi-prediction with two MVs, the two MVs and their reference picture indices are used for the current PU with bi-prediction.

As shown in FIG. 3, the temporal MVP in Skip and Merge modes is derived using list 0 MV or first 1 MV of blocks $T_{RB}$ and $T_{CT}$ in the co-located picture. The temporal MVP is defined as the first available MV crossing the current picture. If both motion vectors cross the current picture, or both do not cross, the one whose reference picture list is the same as the given reference picture list will be selected if available, otherwise the one whose reference picture first is other than the given reference picture list will be selected. The motion vector will be sealed according to temporal distances. The temporal search order and temporal search MVs are the same as these for Inter mode shown in FIG. 2, Nevertheless, different temporal search order and temporal search MVs may be used for Skip and Merge modes.

After all MVPs are found, the redundant MVPs are removed from the candidate set of MVPs before coding the Index of the best MVP.

When a currently available MV selected as an MVP is the same as a previously selected MVP, the currently available MV does not offer any potential for further improving the coding efficiency. The benefit of redundancy cheek becomes apparent. Current HM-3.0 incorporates redundancy check for spatial MVP derivation of the top MVP. The $1^{st}$ priority MVs are checked from block $B_0$ through $B_2$ and the redundancy check is performed every time when an available MV is found as shown in FIG. 1. If no available MV which is not the same as a previously selected MVP is found after the $1^{st}$ priority MV for $B_2$ is searched, the process continues to search MVs with other priorities for each top blocks as shown in FIG. 1. Again, the redundancy cheek is performed every time when an available MV is found for a top block as shown in FIG. 1.

Figure 4:
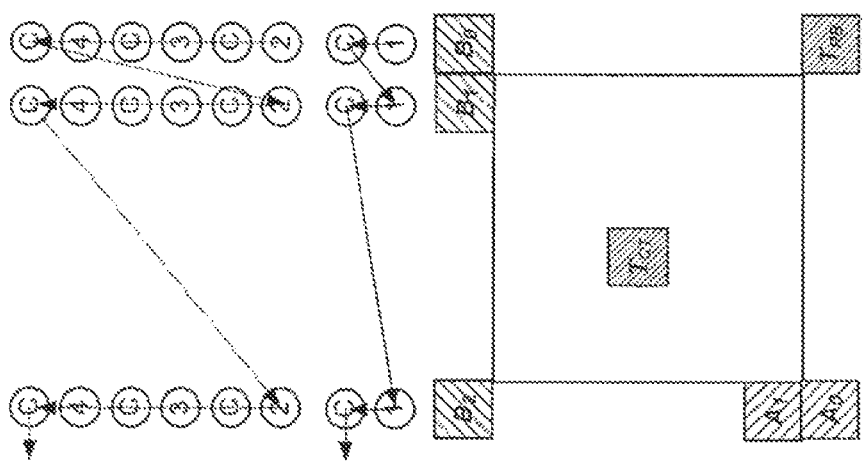
FIG. 4 illustrates the spatial MVP derivation process from top neighboring blocks for Inter mode incorporating an embodiment according to the present invention, where redundancy check is invoked each time when a derived MV is available.
Figure 5:
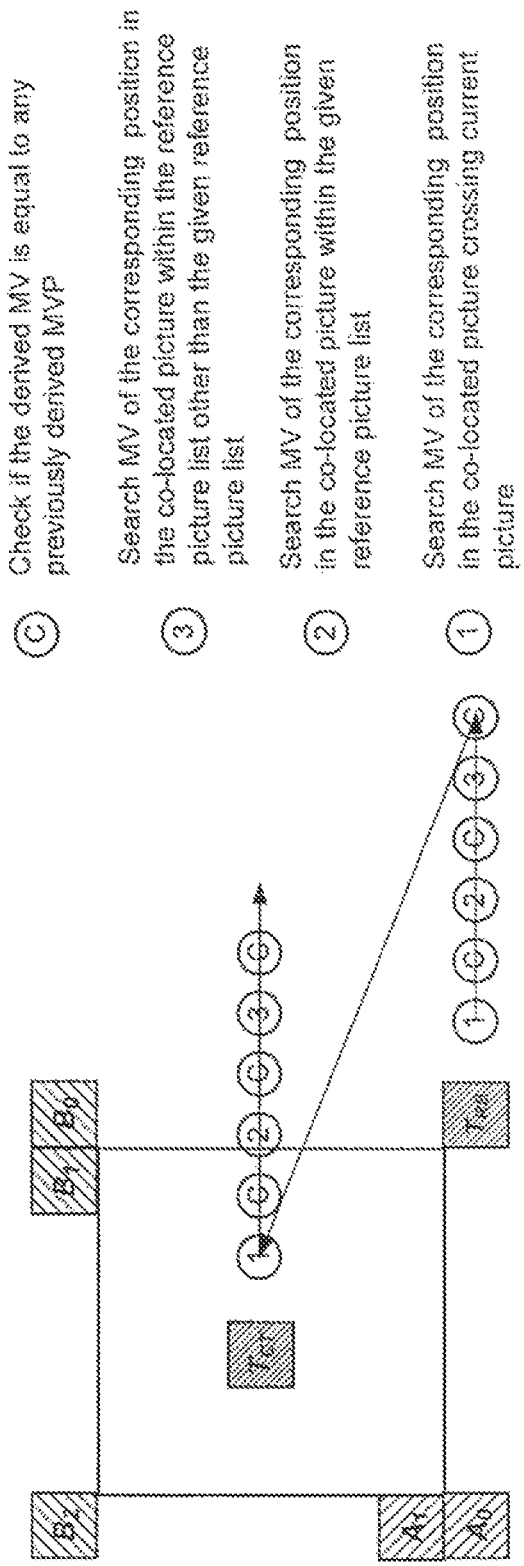
FIG. 5 illustrates the temporal MVP derivation process from co-located blocks for Inter mode incorporating an embodiment according to the present Invention, where redundancy check is invoked each time when a derived MV is available.

Accordingly, in the present invention, the redundancy check is modified to further improve the chance of deriving different MVPs. In one embodiment according to the present invention, a redundant MVP checking procedure for MVP derivation is invoked after the spatial MVP and at least another MVP are derived in order to increase the possibility of obtaining non-redundant MVP candidates. Said another MVP can be another spatial MVP derived from another spatial search set, or a temporal MVP. The redundancy check according to the present invention can be applied to derivation of spatial MVP and/or temporal MVP. Also the redundancy check can be applied to MVP derivation for Inter, Skip and Merge modes. When a derived MV provides the same motion information, such as motion vectors, inter prediction indicators (i.e., single-prediction or bi-prediction), and reference picture indices, as a previously derived MVP, the derived MV is considered as redundant and the derivation process continues to the next step. FIG. 4 illustrates an exemplary spatial MVP derivation with redundancy check incorporating one embodiment of the present invention. The search order in FIG. 4 is the same as the search order of FIG. 1. However, the MVP derivation of FIG. 4 illustrates redundancy check is performed every rime when an available search MV is found. If a search MV does not exist, there is no need to perform redundancy check. Since redundancy check is performed after each spatial search MV of each neighboring reference block is searched, the search MV group consists of a single spatial search MV in this example. FIG. 5 illustrates an exemplary temporal MVP derivation with redundancy check incorporating one embodiment of the present invention. The search order in FIG. 5 is the same as the search order of FIG. 2. However, the MVP derivation of FIG. 5 illustrates that redundancy check is performed every time when an available search MV is found. If a search MV does not exist, there is no need to perform redundancy check. Again, since redundancy check is perform after each temporal search MV of each co-located reference block is searched, the search MV group consists of a single temporal search MV is this example.

Figure 6:
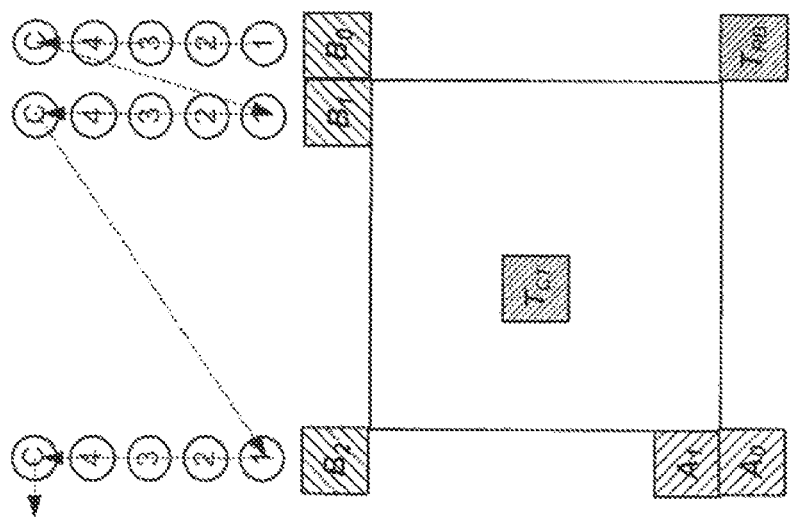
FIG. 6 illustrates the spatial MVP derivation process from top neighboring blocks for Inter mode incorporating an embodiment according to the present invention, where redundancy check is invoked each time when all search MVs for a block are searched and a derived MV is available.
Figure 7:
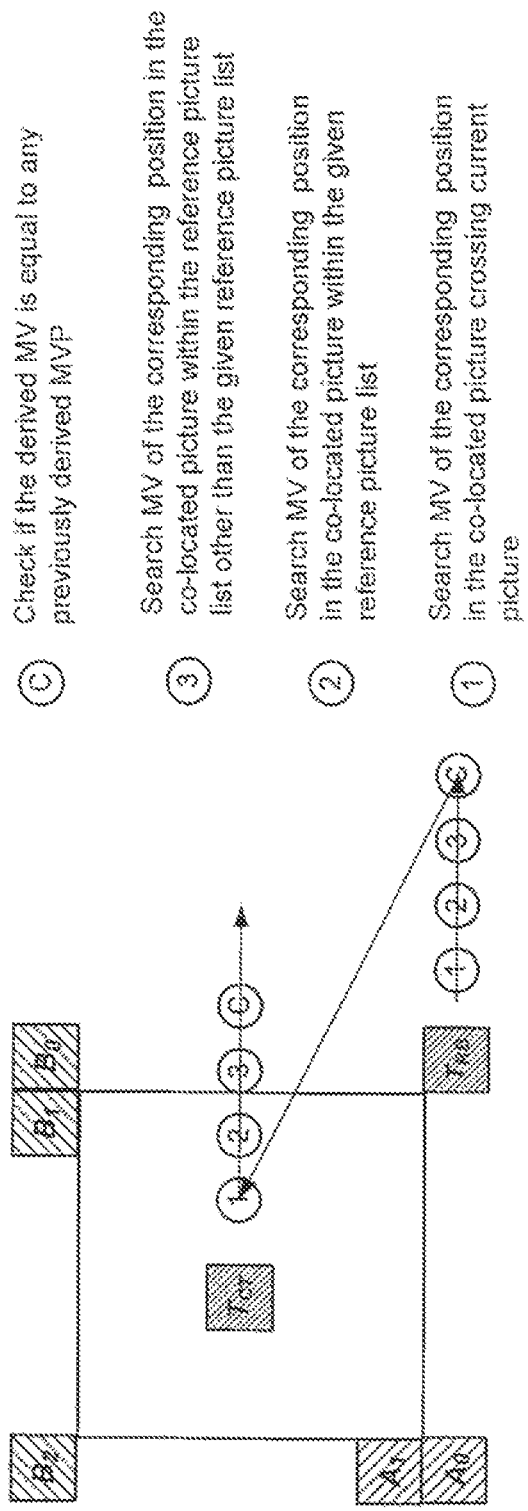
FIG. 7 illustrates the temporal MVP derivation process from co-located blocks for Inter, Skip and Merge modes incorporating an embodiment according to the present invention, where redundancy check is invoked each time when all search MVs for a block are searched and a derived MV is available.

In another MVP derivation process incorporating an embodiment of the present invention, the redundant MVP check can be invoked each time after all search MVs for each reference block are searched. FIG. 6 illustrates an example of spatial MVP derivation that checks redundancy after all search MVs for each top block are searched. For example, the search MVs having $1^{st}$ priority through $4^{th}$ priority are searched for block $B_0$ first. After all search MVs for block $B_0$ are searched, the redundancy check is performed if an available search MV is found for the block. If a search MV is available and the available search MV is not the same as a previously derived MVP, the search MV is accepted as the spatial MVP and the spatial MVP derivation terminates. If a search MV is available and the available search MV is the same as a previously derived MVP, the spatial MVP derivation process moves to the next spatial reverence block. If no available search MV exists for the block, there is no need for redundancy check and the spatial MVP derivation process moves to the next spatial reference block. The same process is repeated for block $B_1$ and then block $B_2$. Since redundancy check is performed alter search MVs from $1^{st}$ priority to $4^{th}$ priority are searched, the spatial search MV group consists of $1^{st}$ priority to $4^{th}$ priority in this example. Also the spatial search order searches from block $B_0$ to $B_2$. In other words, block $B_0$ has higher search priority than block $B_1$, and block $B_1$ has higher search priority than block $B_2$. FIG. 7 illustrates an example of temporal MVP derivation that checks redundancy after all search MVs for each temporal block are searched. After all search MVs for block $T_{RB}$ are searched, the redundancy check is performed to determine if an available search MV is found for the block. If an available search MV is found and the available search MV is not the same as a previously derived MVP, the search MV is accepted as the temporal MVP and the temporal MVP derivation terminates. Otherwise, the temporal MVP derivation will move to the next temporal reference block. If no search MV exists for the block, there is no need for redundancy check and the temporal MVP derivation process moves to the next temporal block. After block $T_{RB}$ is processed, the same process is repeated for block $T_{CT}$. Since redundancy check is performed after search MVs from $1^{st}$ priority to $3^{rd}$ priority are searched, the temporal search MV group consists of $1^{st}$ priority to $3^{rd}$ priority in this example.

Figure 8:
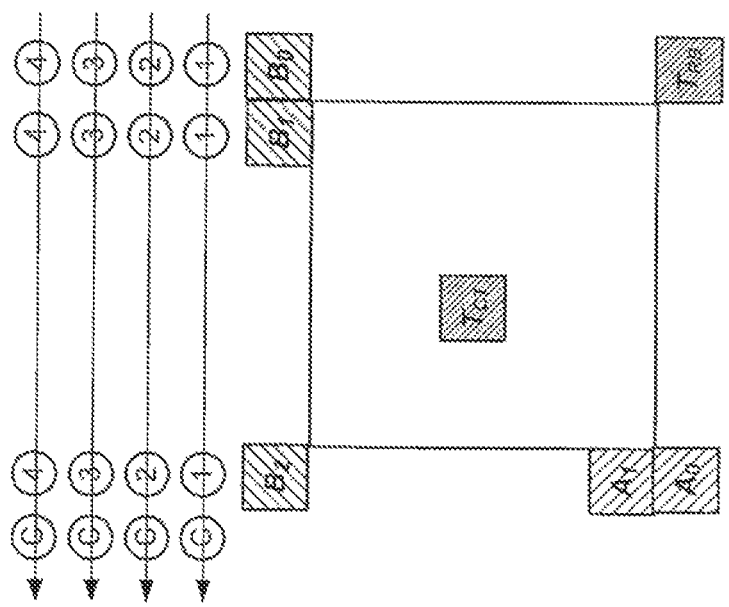
FIG. 8 illustrates the top spatial MVP derivation process from top neighboring blocks for Inter mode incorporating an embodiment according to the present invention, where redundancy check is invoked each time when MVs associated with one priority for different blocks are searched and a derived MV is available.
Figure 9:
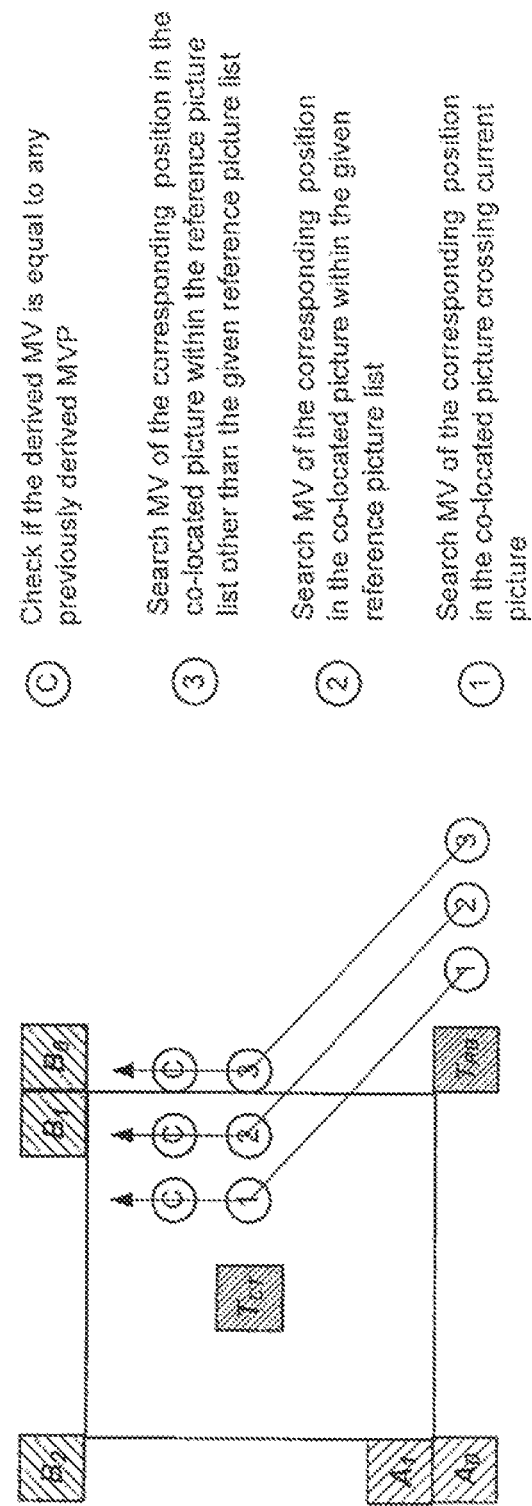
FIG. 9 illustrates the temporal MVP derivation process from co-located blocks for Inter, Skip and Merge modes Incorporating an embodiment according to the present invention, where redundancy cheek is invoked each time when MVs associated with one priority for different blocks, are searched and a derived MV is available.

In yet another MVP derivation process incorporating an embodiment of the present invention, the redundant MVP check can be invoked each time after searching all MVs of the same priority for different reference blocks. FIG. 8 illustrates an example of spatial MVP derivation that checks redundancy alter all search MVs of the same priority for different top blocks are searched. For example, the $1^{st}$-priority MVs for blocks $B_0$ through $B_2$ are searched first. The redundancy check is performed if an available search MV is found for $1^{st}$-priority MVs of blocks $B_0$ through $B_2$. If an available search MV is found and the available search MV is not the same as a previously derived MVP, the search MV is accepted as the spatial MVP and the spatial MVP derivation terminates. If an available search MV is found and the available search MV is the same as a previously derived MVP, the spatial MVP derivation moves to the next priority MVs for blocks $B_0$ through $B_2$. If no available search MV is found for the $1^{st}$-priority MVs of blocks $B_0$ through $B_2$, there is no need for redundancy check and the spatial MVP derivation moves to the next priority MVs for blocks $B_0$ through $B_2$. The same process is repeated for the $2^{nd}$-priority MVs, the $3^{rd}$-priority MVs and then the $4^{th}$-priority MVs. Since redundancy check is performed after spatial search MVs with a same priority from all spatial reference blocks are searched, the spatial search MV group consists of spatial search MVs with the same priority from all spatial reference blocks is this case. FIG. 9 illustrates an example of temporal MVP derivation that cheeks redundancy after all MVs of the same priority for different co-located reference blocks are searched. For example, the $1^{st}$-priority MVs for blocks $T_{RB}$ and $T_{CT}$ are searched first. The redundancy check is performed to determine if an available search MV is found for $1^{st}$-priority MVs of blocks $T_{RB}$ and $T_{CT}$. If an available search MV is found and the search MV is not the same as a previously derived MVP, the search MV is accepted as the temporal MVP and the temporal MVP derivation terminates. If an available search MV is found and the search MV is the same as a previously derived MVP, the temporal MVP derivation moves to the next priority MVs for blocks $T_{RB}$ and $T_{CT}$. If no available search MV is found for the $1^{st}$-priority MVs of blocks $T_{RB}$ and $T_{CT}$, there is no need for redundancy check and the temporal MVP derivation moves to the next priority MVs for blocks $T_{RB}$ and $T_{CT}$. The same process is repeated for the $2^{nd}$-priority MVs and then the $3^{rd}$-priority MVs.

Figure 10:
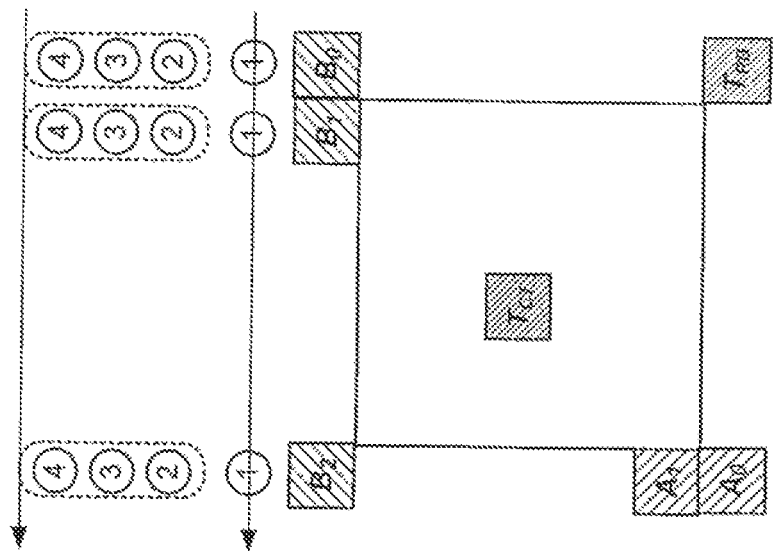
FIG. 10 illustrates the top spatial MVP derivation process from top neighboring blocks for Inter mode incorporating an embodiment according to the present invention, where redundancy check is disabled for the top spatial MVP derivation process.

The redundant MVP checking procedure can be disabled during the derivation of one MVP. FIG. 10 illustrates an example incorporating an embodiment of the present invention where no redundant MVP checking procedure is invoked during the derivation of the top MVP for Inter mode. The left MVP is the first available one within the reference blocks on the left (i.e., $A_0$ and $A_1$), and the top MVP is also the first available one within the reference blocks on the top (i.e., $B_0$, $B_1$, and $B_2$). The process of redundancy check is performed after the left spatial MVP and the top spatial MVP are derived. Therefore, the searching process of the left spatial MVP and the top spatial MVP can be performed in parallel. Furthermore, the process of redundancy check can performed after the left spatial MVP, the top spatial MVP, and the temporal MVP are derived.

Embodiment of MVP derivation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving a motion vector predictor (MVP) for a motion, vector (MV) of a current block in Inter, or Merge, or Skip mode, the method being executed by a processor and comprising:

receiving motion vectors (MVs) associated with reference blocks of the current block, wherein the reference blocks comprise at least one neighboring reference block of the current block;

determining a spatial search set, wherein the spatial search set comprises at least two spatial search MVs with spatial priorities for the at least one neighboring reference block, wherein said at least two spatial search MVs for the at least one neighboring reference block are configured into spatial search MV groups, and wherein each of the spatial search MV groups consists of at least one of said at least two spatial search MVs for the at least one neighboring reference block;

determining whether a first available spatial MV exists for each of the spatial search MV groups according to a spatial search order for the spatial search MV groups, wherein said determining whether a first available spatial MV exists moves to a next spatial search MV group if the first available spatial MV does not exist; and providing the first available spatial MV as a spatial MVP for the current block, wherein a process of redundancy check is performed after the spatial MVP and at least another MVP are derived.

2. The method of claim 1, wherein said determining whether a first available spatial MV exists moves to a next spatial search MV group if the first available spatial MV does not exist or the first available spatial MV is redundant.

3. The method of claim 1, wherein the neighboring reference blocks comprise a right-most block on top side, an upper-left corner block and an upper-right corner block of the current block in the Inter, Skip or Merge mode, and wherein the spatial search order for the neighboring reference blocks is from right to left.

4. The method of claim 1, wherein the neighboring reference blocks comprise a leftmost block on top side and an upper-right corner block of the current block in the Inter, Merge or Skip mode, and wherein, the spatial search order for the neighboring reference blocks is from the upper-right corner block to the leftmost block so the top side.

5. The method of claim 1, wherein said at least two spatial search MVs for the at least one neighboring reference block include a first spatial search MV pointing to a target reference picture in given reference list, a second spatial search MV pointing to the target reference picture the other reference list, a third spatial search MV pointing to other reference pictures is the given reference list and a fourth spatial search MV pointing to the otter reference pictures in the other reference list, wherein the first spatial search MV is assigned first spatial priority, the second spatial search MV is assigned second spatial priority, the third spatial search MV is assigned thirst spatial priority, and the fourth spatial search MV is assigned fourth spatial priority.

6. The method of claim 1, wherein the spatial search order searches the spatial search MV groups associated with the at least one neighboring reference block from a highest priority neighboring reference block to a lowest priority neighboring reference block.

7. The method of claim 1, wherein the spatial search order searches higher-priority spatial search MV groups associated with each of the neighboring reference blocks from a highest priority neighboring reference block to a lowest priority neighboring reference block and then searches lower-priority spatial search MV groups associated with each of the neighboring reference blocks from the highest priority neighboring reference block to the lowest priority neighboring reference block, when each of the spatial search MV groups consists of one of said at least two spatial search MVs of one of the neighboring reference blocks.

8. The method of claim 1, wherein the first available spatial MV is redundant if the first available spatial MV is the same as a previous spatial MVP derived from the neighboring reference blocks on left side of the current block.

9. The method of claim 1, wherein the first available spatial MV is accepted as the spatial MVP and derivation process for the spatial search set terminates if the first available spatial MV is found in one of the spatial search MV group.

10. The method of claim 1, wherein the first available spatial MV is accepted as the spatial MVP without redundancy check and derivation process for the spatial search set terminates if the first available spatial MV is found in one of the spatial search MV group.

11. The method of claim 1, wherein the wherein each of the spatial search MV groups consists of one of said at least two spatial search MVs of one of the neighboring reference blocks, all of said at least two spatial search MVs for each of the neighboring reference blocks, or said at least two spatial search MVs having a same spatial priority for all of the neighboring reference blocks.

12. The method of claim 1 further comprising:

receiving the motion vectors (MVs) associated with reference blocks of the current block, wherein the reference blocks comprise one or more co-located reference blocks of the current block;

determining a temporal search set, wherein the temporal search set comprises at least two temporal search MVs with temporal priorities for each of said one or more co-located reference blocks, wherein said at least two temporal search MVs for said one or more co-located reference blocks are configured into temporal search MV groups, and wherein each of the temporal search MV groups consists of one of said at least two temporal search MVs of one of said one or more co-located reference blocks, all of said at least two temporal search MVs for each of said one or more co-located reference blocks, or said at least two temporal search MVs having a same temporal priority for all of said one or more co-located reference blocks;

determining whether a first available temporal MV exists for each of the temporal search MV groups according to a temporal search order for the temporal search MV groups, wherein said determining whether a first available temporal MV exists moves to a next temporal search MV group if the first available temporal MV does not exist or the first available temporal MV is redundant; and providing the first available temporal MV as a temporal MVP for the current block.

13. The method of claim 12, wherein said one or more co-located reference blocks comprise a center co-located block located at center of the co-located block and a right-bottom co-located block, located across from a lower-right corner of the co-located block.

14. The method of claim 12, wherein the first available temporal MV is redundant if the first available temporal MV is the same as a previous spatial MVP derived from the neighboring reference blocks.

15. An apparatus of deriving a motion vector predictor (MVP) for a motion vector (MV) of a current block in Inter, or Merge, or Skip mode, the apparatus comprising:

means for receiving motion vectors (MVs) associated with reference blocks of the current block, wherein the reference blocks comprise at least one neighboring reference block of the current block;

means for determining a spatial search set, wherein the spatial search set comprises at least two spatial search MVs with spatial priorities for the at least one neighboring reference block, wherein said at least two spatial search MVs for the at least one neighboring reference block are configured into spatial search MV groups, and wherein each of the spatial search MV groups consists of at least one of said at least two spatial search MVs for the at least one neighboring reference block;

means for determining whether a first available spatial MV exists for each of the spatial search MV groups according to a spatial search order for the spatial search MV groups, wherein said determining whether a first available spatial MV exists moves to a next spatial search MV group if the first available spatial MV does not exist; and means for providing the first available spatial MV as a spatial MVP for the current block, wherein a process of redundancy check is performed after the spatial MVP and at least another MVP are derived.

16. A method of denying a motion vector predictor (MVP) for a motion vector (MV) of a current block in inter, or Merge, or Skip mode, the method comprising:

receiving the motion vectors (MVs) associated with reference blocks of the current block, wherein the reference blocks comprise one or more co-located reference blocks of the current block;

determining a temporal search set, wherein the temporal search set comprises at least two temporal search MVs with temporal priorities for each of said one or more co-located reference blocks, wherein said at least two temporal search MVs for said one or more co-located reference blocks are configured into temporal search MV groups, and wherein each of the temporal search MV groups consists of one of said at least two temporal search MVs of one of said one or mere co-located reference blocks, all of said at least two temporal search MVs for each of said one or more co-located reference blocks, or said at least two temporal search MVs having a same temporal priority for all of said one or more co-located reference blocks;

determining whether a first available temporal MV exists for each of the temporal search MV groups according to a temporal search order for the temporal search MV groups, wherein said determining whether a first available temporal MV exists moves to a next temporal search MV group if the first available temporal MV does not exist or the first available temporal MV is redundant; and providing the first available temporal MV as a temporal MVP for the current block, wherein a process of redundancy check is performed after the temporal MVP and at least another MVP are derived.

17. The method of claim 16, wherein said one or more co-located reference blocks comprise a center co-located block located at center of the co-located block and a right-bottom co-located block located across from a lower-right corner of the co-located block.

18. The method of claim 16, wherein the first available temporal MV is redundant if the first available temporal MV is the same as a previous spatial MVP derived from neighboring reference blocks.

* * * * *